United States Patent
Arnold et al.

(10) Patent No.: US 8,083,819 B2
(45) Date of Patent: Dec. 27, 2011

(54) HYDROGEN-PRODUCING FUEL PROCESSING AND FUEL CELL SYSTEMS WITH A TEMPERATURE-RESPONSIVE AUTOMATIC VALVE SYSTEM

(75) Inventors: John R. Arnold, Bend, OR (US); James A. Givens, Bend, OR (US); Arne LaVen, Bend, OR (US)

(73) Assignee: Idatech, LLC, Bend, OR (US)

( * ) Notice: Subject to any disclaimer, the term of this patent is extended or adjusted under 35 U.S.C. 154(b) by 730 days.

(21) Appl. No.: 12/199,214

(22) Filed: Aug. 27, 2008

(65) Prior Publication Data
US 2010/0050520 A1    Mar. 4, 2010

(51) Int. Cl.
*B01J 7/00* (2006.01)
*C01B 3/36* (2006.01)
*C10J 3/46* (2006.01)

(52) U.S. Cl. ......... 48/197 R; 48/61; 48/127.9; 423/650; 423/651; 423/652; 423/DIG. 5; 422/108; 422/129; 422/187

(58) Field of Classification Search ........... 48/61, 127.9, 48/197 R; 423/650, 651, 652, DIG. 5; 422/108, 422/129, 187
See application file for complete search history.

(56) References Cited

U.S. PATENT DOCUMENTS

| | | | |
|---|---|---|---|
| 2,824,620 A | 2/1958 | De Rosset | |
| 3,336,730 A | 8/1967 | McBride et al. | |
| 3,338,681 A | 8/1967 | Kordesch | |
| 3,350,176 A | 10/1967 | Green et al. | |
| 3,469,944 A | 9/1969 | Bocard et al. | |
| 3,522,019 A | 7/1970 | Buswell et al. | |
| 3,655,448 A | 4/1972 | Setzer | |
| 3,920,416 A | 11/1975 | Houseman | |
| 4,038,034 A | 7/1977 | Nakajima et al. | |
| 4,041,694 A | 8/1977 | Lewis | |
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,228,914 A | 10/1980 | Sanderson | |
| 4,378,907 A | 4/1983 | Hashimoto | |
| 4,457,327 A | 7/1984 | Pepper | |
| 4,468,235 A | 8/1984 | Hill | |
| 5,352,416 A | 10/1994 | Wagner | |

(Continued)

FOREIGN PATENT DOCUMENTS

WO    WO 2006/041857 A2    4/2006

(Continued)

*Primary Examiner* — Timothy Vanoy
(74) *Attorney, Agent, or Firm* — Dascenzo Intellectual Property Law, P.C.

(57) ABSTRACT

Hydrogen-producing fuel processing assemblies and fuel cell systems with at least one temperature-responsive valve assembly, and methods for feedback regulation of the hydrogen-producing region. The temperature-responsive valve assembly responds automatically to the temperature of a gas stream of interest to regulate the flow of a subject gas stream therethrough. In some embodiments, these streams are the same streams, while in others, they are different streams. The streams may include at least the reformate stream from a hydrogen-producing region of the fuel processing assembly, the byproduct stream from a purification region, and the product gas stream from the purification region. In some embodiments, the subject gas stream may be the byproduct stream, which is in fluid communication for delivery as a combustible fuel stream for a burner or other heating assembly that produces an exhaust stream to heat the hydrogen-producing region of the fuel processing assembly.

32 Claims, 3 Drawing Sheets

U.S. PATENT DOCUMENTS

| | | |
|---|---|---|
| 5,401,589 A | 3/1995 | Palmer et al. |
| 5,432,710 A | 7/1995 | Ishimaru et al. |
| 5,637,414 A | 6/1997 | Inoue et al. |
| 5,861,137 A | 1/1999 | Edlund |
| 5,997,594 A | 12/1999 | Edlund et al. |
| 6,083,637 A | 7/2000 | Walz et al. |
| 6,221,117 B1 | 4/2001 | Edlund et al. |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 6,821,658 B2 | 11/2004 | Acker et al. |
| 6,863,221 B2 | 3/2005 | Colas et al. |
| 7,032,675 B2 | 4/2006 | Steele et al. |
| 7,132,186 B2 | 11/2006 | Saito |
| 7,163,566 B2 | 1/2007 | Doling et al. |
| 2005/0221149 A1 | 10/2005 | Matsubayashi et al. |
| 2006/0090397 A1 | 5/2006 | Edlund et al. |
| 2007/0056634 A1 | 3/2007 | Yokoi et al. |
| 2009/0280036 A1* | 11/2009 | Reiser et al. ............. 422/111 |

FOREIGN PATENT DOCUMENTS

| | | | |
|---|---|---|---|
| WO | WO 2006/041857 A3 | 4/2006 | |

* cited by examiner

HYDROGEN-PRODUCING FUEL PROCESSING AND FUEL CELL SYSTEMS WITH A TEMPERATURE-RESPONSIVE AUTOMATIC VALVE SYSTEM

FIELD OF THE DISCLOSURE

The present disclosure is directed generally to hydrogen-producing fuel cell systems, and more particularly to hydrogen-producing fuel cell systems having a temperature-responsive valve system that responds automatically to the temperature of a hydrogen-containing gas produced by a hydrogen generation assembly to regulate the operation of the hydrogen generation assembly.

BACKGROUND OF THE DISCLOSURE

A hydrogen generation assembly, or hydrogen-producing fuel processing assembly, is an assembly that converts one or more feedstocks into a hydrogen-containing gas stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen gas is the fuel, the oxygen gas is the oxidant, and the water is a reaction product. Fuel cells are typically coupled together to form a fuel cell stack.

A hydrogen-producing fuel cell system is a hydrogen-producing fuel processing assembly that also includes a fuel cell stack that is adapted to receive hydrogen gas produced by the fuel processing assembly and to generate an electric current therefrom. The hydrogen-producing fuel processing assembly includes a hydrogen-producing region in which hydrogen gas is produced as a majority reaction product from one or more feedstocks. The reaction conditions in the hydrogen-producing region may affect the performance of the hydrogen generation assembly. This, in turn, may affect the performance of the fuel cell stack, the hydrogen-producing fuel cell system, and/or its ability to satisfy an applied load thereto. Accordingly, hydrogen-producing fuel processing assemblies and hydrogen-producing fuel cell systems will typically include various controls for regulating the reaction conditions in the hydrogen-producing region. Typically, these controls include a variety of manual and/or computerized controls.

To efficiently produce hydrogen gas, the hydrogen-producing region of the fuel processing assembly should be maintained at the desired operating conditions, including temperatures and pressures in a predetermined range for producing hydrogen gas. The product hydrogen stream from the hydrogen-producing region may be purified, if needed, and thereafter used as a fuel stream for a fuel cell stack, which produces an electric current from the product hydrogen stream and an oxidant, such as air. This electric current, or power output, from the fuel cell stack may be utilized to satisfy the energy demands of an energy-consuming device.

A consideration with any hydrogen-producing fuel processing assembly and/or fuel cell system is the ability to maintain the hydrogen generation region within a range of efficient reaction conditions. Maintaining the temperature of the hydrogen-producing region is a challenge in the design and operation of a hydrogen generation assembly. The particular optimal temperature range for a hydrogen-producing region may vary based upon such factors as the type of hydrogen-producing mechanism to be utilized, the particular feedstock(s) being used, etc. In many applications, optimal reaction conditions are maintained by manual control, while in other situations the reaction conditions may be maintained at peak efficiency by a microprocessor-based controller assembly. When the hydrogen generation assembly is already at a suitable hydrogen-producing temperature, the fuel cell system may be able to operate with a minimum of outside influence as long as the demand for hydrogen gas remains relatively constant. However, as this demand and/or other reaction conditions, or operating parameters, of the hydrogen-producing region change, the efficiency and/or stability of the hydrogen generation assembly (and/or fuel cell system) may quickly diminish. When the hydrogen generation assembly is not already at or near a desired hydrogen-producing temperature, the assembly may require some external influence or control to be applied.

Conventionally, microprocessor-based controllers have been used to provide control signals that can maintain the hydrogen-producing region of a hydrogen generation assembly within a suitable hydrogen-producing temperature range in the absence of direct human intervention. One approach is to include a series of valves or other system-altering inputs that may be used to manipulate the flow of reactants and/or energy inputs to the hydrogen-producing region. However, the ability of such a controller is limited, and may depend on its programming, its being free from operational interruption, the input signals with which it is provided, and so on.

DETAILED DESCRIPTION AND BEST MODE OF THE DISCLOSURE

The present disclosure is directed to systems and methods for controlling the rate of production of a hydrogen-containing gas by a hydrogen-producing region of a hydrogen-producing fuel processing assembly and/or fuel cell system responsive at least in part to the temperature of a gas in the assembly and/or system. Typically, this gas will be the hydrogen-containing gas although it is within the scope of the present disclosure that the gas may be, or include, a byproduct gas from a separation region, or purification region, associated with the hydrogen-producing region.

Figure 1:
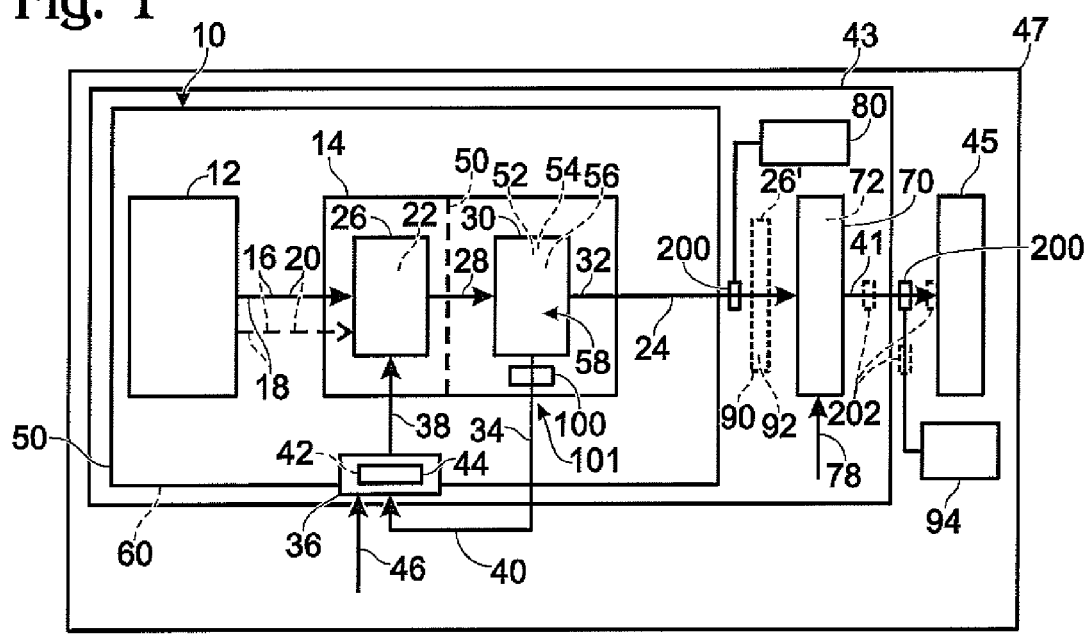
FIG. 1 is a schematic view of an illustrative hydrogen-generating fuel cell system according to the present disclosure.

A steam reforming hydrogen generation assembly according to the present disclosure is schematically illustrated in FIG. 1 and generally indicated at 10. Hydrogen generation assembly 10 includes a feedstock delivery system 12 and a hydrogen-producing fuel processing assembly 14 with a hydrogen-producing region 26. Fuel processing assembly, or system, 14, is adapted to receive from the feedstock delivery system at least one feed stream 16 containing reactants for producing hydrogen gas in the hydrogen-producing region. In some embodiments, the feedstock delivery system is adapted to provide, or deliver, at least one feed stream containing at least one of water 18 and a carbon-containing feedstock 20. Illustrative, non-exclusive examples of suitable carbon-containing feedstocks 20 include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol. While not required of all embodiments, in some embodiments the carbon-containing feedstock will be a liquid carbon-containing feedstock, and in some embodiments the carbon-containing feedstock will be miscible with water. These reactants will typically be vaporized, such as in a vaporization region in, or associated with, fuel processing assembly 14.

For the purpose of brevity, the following discussion will refer to a fuel processing assembly 14 with a hydrogen-producing region 26 that is adapted to produce hydrogen gas by steam reforming one or more feed streams 16 containing water 18 and a carbon-containing feedstock 20. It is within the scope of the present disclosure that other feed stream reactants may be used and/or that other hydrogen-producing reactions may be utilized, including but not limited to other endothermic reactions.

In a steam reforming reaction, the fuel processing assembly 14 chemically reacts the water and the carbon-containing feedstock in the presence of a suitable steam reforming catalyst 22 and produces a hydrogen-containing gas stream 24 containing hydrogen gas as a majority component, and in many embodiments which also includes other gases as minority components. In some embodiments, the product hydrogen stream contains pure, or at least substantially pure, hydrogen gas. Fuel processing assembly 14 includes a hydrogen-producing region 26, in which an output stream 28 containing hydrogen gas is produced by a steam reforming reaction that utilizes a suitable steam reforming catalyst 22, as indicated in dashed lines in FIG. 1. Illustrative, non-exclusive examples of suitable steam reforming catalysts are disclosed in U.S. Patent Application Publication No. 2006/0236607, the complete disclosure of which is hereby incorporated by reference. Output stream 28 includes hydrogen gas as at least a majority component. Output stream 28 may additionally or alternatively be referred to as a reformate stream or a reformate gas stream, and when it also includes other gases in addition to hydrogen gas, as a mixed gas stream.

Output stream 28 may include one or more additional gaseous components, and thereby may be referred to as a mixed gas stream that contains hydrogen gas as its majority component but which also includes other gases as minority components. Examples of other gases that may be present in the reformate stream from the steam reforming reaction that occurs in hydrogen-producing region 26 include carbon monoxide, carbon dioxide, methane, steam, and/or unreacted carbon-containing feedstock. In a steam reforming process, the fuel processing assembly 14 may be referred to as a steam reformer, hydrogen-producing region 26 may be referred to as a reforming region, and output, or mixed gas, stream 28 may be referred to as a reformate stream.

Fuel processing assemblies 14 and/or hydrogen generation assemblies 10 according to the present disclosure may include at least one purification region 30 in which the concentration of hydrogen gas in output, or reformate, stream 28 is increased and/or the concentration of at least one of the other gases in the output stream is reduced. Purification region 30 may additionally or alternatively be referred to as a separation region, and while the purity of the hydrogen gas in the product hydrogen stream is increased compared to the reformate stream, it is not required to all embodiments that the product hydrogen stream be pure hydrogen gas. Output stream 28 may be delivered to purification region 30, as shown in FIG. 1, which may separate the output stream into a hydrogen-rich stream 32 and a byproduct stream 34. In such an embodiment, the product hydrogen-rich stream contains at least one of a greater concentration of hydrogen gas and/or a lower concentration of at least one of the other gases relative to the output stream. It is within the scope of the present disclosure that hydrogen-rich stream 32 may be referred to as a first product stream, and byproduct stream 34 may be referred to as a second product stream.

As shown in FIG. 1, product hydrogen stream 24 includes at least a portion of hydrogen-rich stream 32. Accordingly, hydrogen-rich stream 32 and product hydrogen stream 24 may be the same stream and have the same compositions and flow rates. However, it is also within the scope of the present disclosure that some of the purified hydrogen gas in hydrogen-rich stream 32 may be stored for later use, such as in a suitable hydrogen storage assembly, and/or consumed by the hydrogen generation assembly, such as for use as a fuel stream for a heating assembly.

Byproduct stream 34 contains at least a substantial portion of one or more of the other gases and may, but is not required to, include some hydrogen gas. When present, byproduct stream 34 may be exhausted, sent to a burner assembly or other combustion source, used as a heated fluid stream, stored for later use, or otherwise utilized, stored, or disposed of. It is within the scope of the disclosure that byproduct stream 34 may be emitted from the purification region as a continuous stream, such as responsive to the delivery of output stream 28 to the purification region, or intermittently, such as in a batch process or when the byproduct portion of the output stream is retained at least temporarily in the purification region. In some embodiments, the byproduct stream may contain sufficient hydrogen gas and/or combustible other gases that the byproduct stream may be used as a gaseous fuel stream for a burner, combustion region, or other heating assembly that is adapted to combust a fuel stream in the presence of air to produce a heated output stream.

Producing hydrogen gas by steam reforming water and a carbon-containing feedstock is an endothermic reaction. Accordingly, hydrogen generation assembly 10 may require a heat source, or heating assembly, 36 that is adapted to heat at least hydrogen-producing region 26 of the fuel processing assembly to a suitable temperature, or range of temperatures, for producing hydrogen gas therein and to maintain the hydrogen-producing region at this temperature, or within this temperature range, while the hydrogen-producing region is being used to produce hydrogen gas. Heating assembly 36 also may heat other portions of the hydrogen generation assembly and may vaporize one or more of the reactants for the hydrogen-producing region.

As an illustrative example of temperatures that may be achieved and/or maintained in hydrogen-producing region 26 through the use of heating assembly 36, steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., 375-400° C., 400-500° C., and 426-450° C. When the carbon-containing feedstock is a hydrocarbon, ethanol or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

It is within the scope of the present disclosure for the hydrogen-producing region to include two or more zones, or portions, each of which may be operated at the same or at different temperatures. For example, when the carbon-containing feedstock includes a hydrocarbon, in some embodiments it may be desirable to include two different hydrogen-producing zones, or portions, with one operating at a lower temperature than the other to provide a pre-reforming region. In such an embodiment, the fuel processing assembly may alternatively be described as including two or more hydrogen-producing regions, and/or as including two or more hydrogen-producing regions that are connected in series, with the output stream from the first region forming at least a portion of the feed stream for the second hydrogen-producing region.

Heating assembly 36 may combust the byproduct stream to produce a heated output stream, or heated exhaust stream, 38 to heat at least the hydrogen-producing region of the fuel processing assembly. In some embodiments, the byproduct stream may have sufficient fuel value (i.e., hydrogen and/or other combustible gas content) to enable the heating assembly, when present, to maintain the hydrogen-producing region at a desired operating (i.e. hydrogen-producing) temperature, above a minimum hydrogen-producing temperature, and/or within a selected range of temperatures. Therefore, while not required, it is within the scope of the present disclosure that the byproduct stream may include hydrogen gas, such as 10-30 wt % hydrogen gas, 15-25 wt % hydrogen gas, 20-30 wt % hydrogen gas, at least 10 or 15 wt % hydrogen gas, at least 20 wt % hydrogen gas, etc.

In the illustrative, non-exclusive example shown in FIG. 1, fuel processing assembly 14 includes a hydrogen-producing region 26 and a heating assembly 36. Heating assembly 36 is adapted to produce a heated exhaust stream, or combustion stream, 38 from heating fuel stream 40, typically as combusted in the presence of air. In some embodiments, heating fuel stream 40 may be at least partially, at least substantially, or even completely formed or derived from byproduct stream 34. Heated exhaust stream 38 is schematically illustrated in FIG. 1 as heating hydrogen-producing region 26, such as to a suitable hydrogen-producing temperature or range of temperatures. Heating assembly 36 may utilize any suitable structure for generating heated exhaust stream 38, such as a burner or combustion catalyst in which a fuel is combusted with air to produce the heated exhaust stream. Heating assembly 36 may include an igniter, or ignition source, 42 that is adapted to initiate the combustion of fuel, and thereby the generation of exhaust stream 38. Illustrative, non-exclusive examples of suitable ignition sources include one or more of spark plugs, glow plugs, combustion catalyst, pilot lights, piezoelectric igniters, and the like.

In some hydrogen-producing fuel processing assemblies according to the present disclosure, heating assembly 36 includes a burner, or burner assembly, 44 and may be referred to as a combustion-based, or combustion-driven, heating assembly. In a combustion-based heating assembly, the heating assembly 36 is adapted to receive at least one fuel stream 40 and to combust the fuel stream in the presence of air to provide a hot combustion stream 38 that may be used to heat at least the hydrogen-producing region 26 of the fuel processing assembly. As discussed in more detail herein, air may be delivered to the heating assembly via a variety of mechanisms. In FIG. 1, an air stream 46 is shown; however, it is within the scope of the disclosure for the air stream to additionally or alternatively be delivered to the heating assembly with at least one of the fuel streams 40 for the heating assembly 36 and/or drawn from the environment within which the heating assembly is utilized. Illustrative, non-exclusive examples of burner assemblies that may be utilized in hydrogen-producing fuel processing systems are disclosed in U.S. Patent Application Publication Nos. 2003/0223926 and 2006/0090397, the complete disclosures of which are hereby incorporated by reference.

As also schematically illustrated in FIG. 1, it is within the scope of the present disclosure that heating assembly 36 is housed in a common shell, or housing, 50 with the hydrogen-producing region and/or purification region(s), although this construction is not required. It is also within the scope of the present disclosure that the heating assembly may be separately positioned relative to the hydrogen-producing region but in thermal and/or fluid communication therewith to provide the desired heating of at least the hydrogen-producing region. In FIG. 1, heating assembly 36 is shown in an overlapping relationship with fuel processing assembly 14 to graphically represent that it is within the scope of the disclosure that the heating assembly may be located partially or completely within fuel processing assembly 14, such as being at least partially within shell 50, and/or that at least a portion, or all, of the heating assembly may be located external the fuel processing assembly. In this latter embodiment, the hot combustion gases from the burner assembly will be delivered via suitable heat transfer conduits to the hydrogen-producing region or other portion of the hydrogen generation assembly to be heated.

Depending on the configuration of the hydrogen generation assembly 10 and fuel processing assembly 14, heating assembly 36 may be configured to heat the feedstock delivery system, the at least one feed stream emitted therefrom, the hydrogen-producing region, the purification (or separation) region, or any combination of these elements or selected components thereof. The heating of the one or more feed streams may include vaporizing liquid components of the feed stream(s). Heating assembly 36 may also be configured to heat other components of the hydrogen generation assembly 10. For example, the heated exhaust stream may be adapted to heat a pressure vessel or other canister containing the heating fuel and/or the hydrogen-production fluid that form at least portions of streams 16 and 40. While not required, increasing the temperature of a vessel may increase the pressure of the fluids stored within the vessel, which may be desirable in some applications.

As discussed herein, hydrogen-producing fuel processing assembly 14 includes at least one restrictive orifice or other flow restrictor downstream of at least one purification region, such as associated with one or more of the product hydrogen stream, hydrogen-rich stream, and/or byproduct stream. As shown in FIG. 1, heating assembly 36 may use as a fuel a byproduct stream 34 supplied from purification region 30. Flow of byproduct stream 34 to the heating assembly may be regulated by a temperature-sensitive valve assembly 100 that is adapted to regulate the flow of byproduct stream 34 as a fuel for heating assembly 36 in response to a sensed temperature of the hydrogen generation assembly. The temperature-sensitive valve assembly may additionally or alternatively be described as a temperature-responsive valve assembly. The temperature-responsive valve assembly may be configured as an automatic (non-computerized) valve that responds (directly or indirectly) to changes in the temperature of at least one of the gas streams emitted by the hydrogen generation assembly.

The temperature-responsive valve assembly 100 is adapted to regulate the flow rate of a subject gas stream through the valve assembly in response to the temperature of a gas stream of interest. Illustrative, non-exclusive examples of such streams that may be implemented as the subject gas stream or the gas stream of interest include reformate stream 28, product stream 24, and/or byproduct stream 34. As discussed herein, the "subject gas stream" may be a gas stream whose flow is regulated by the temperature-responsive valve assembly 100 responsive to the temperature of the valve assembly, and the "gas stream of interest" may be a gas stream with a temperature to which the temperature-responsive valve assembly 100 is responsive. The subject gas stream and the gas stream of interest may include a single gaseous component, or more than one gaseous component. For example, the subject gas stream may be byproduct gas stream 34 while the gas stream of interest may be output gas stream 28. It is within the scope of the present disclosure that the subject gas stream and the gas stream of interest may be the same gas stream and/or may have the same composition, and further that the temperature-responsive valve assembly 100 may be responsive to the temperature of the same gas stream whose flow is regulated. For example, byproduct gas stream 34 may be regulated in response to its own temperature and thus may form both the subject gas stream and the gas stream of interest.

In a further variant, and within the scope of the present disclosure, at least one of the subject gas stream and the gas stream of interest may include at least one liquid component or may even be a primarily or completely liquid stream at the operating conditions in which the stream flows through the temperature-responsive valve assembly. In such an embodiment, the subject gas stream and the gas stream of interest may respectively be referred to as a subject liquid stream and a liquid stream of interest. Accordingly, it is within the scope of the present disclosure that the discussion relating to the use of the temperature-responsive valve assembly with respect to gas streams may be applied to one or more liquid (or liquid-containing) streams, and that the subject gas stream and the gas stream of interest may additionally or alternatively be referred to as the subject fluid stream and the fluid stream of interest, respectively, without departing from the scope of the present disclosure.

FIG. 1 schematically indicates that the temperature-responsive valve assembly 100 may be incorporated into a conduit 101 containing the byproduct stream 34 as it leaves the purification region. In this configuration, the temperature-responsive valve assembly 100 may be configured to entrain and be in thermal communication with the byproduct stream and to react to the temperature of that stream in controlling its flow. In another embodiment, shown in FIG. 2, temperature-responsive valve assembly 100 may be configured to provide a passageway for, or to interact with, both the byproduct stream 34 and the output stream 28. In this configuration, the temperature-responsive valve assembly 100 may be configured to entrain the byproduct stream while also being thermally connected to, or entraining, the output stream 28. Further details of an exemplary embodiment of temperature-responsive valve assembly 100 are discussed below in the context of FIGS. 3-8.

While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. In some embodiments, each feed stream 16 may (but is not required to) be associated with a different feedstock delivery system 12, or portions thereof. For example, when more than one feedstock delivery system 12 is utilized, the systems may (but are not required to) draw at least a portion of their outlet streams from a common supply. When feed stream 16 contains two or more components, such as a carbon-containing feedstock and water, the components may be delivered in the same or different feed streams.

For example, when a liquid carbon-containing feedstock is used that is miscible with water, such as methanol or another water-soluble alcohol, the feedstock delivery system may be (but is not required to be) adapted to deliver a liquid feed stream 16 that contains a mixture of water and the carbon-containing feedstock. The ratio of water to carbon-containing feedstock in such a feed stream may vary according to such factors as the particular carbon-containing feedstock being used, user preferences, the design of the hydrogen-production region, etc. Typically the molar ratio of water to carbon will be approximately 1:1 to 3:1. Mixtures of water and methanol will often be delivered at or near a 1:1 molar ratio (31 vol % water, 69 vol % methanol), while mixtures of hydrocarbons or other alcohols will often be delivered at a molar ratio greater than 1:1 water-to-carbon. Additional illustrative, non-exclusive examples of water-to-carbon ratios that may be used for steam reforming of methanol and water include ratios that are greater than 1:1, such as ratios in the range of 1.1:1-1.5:1.

As a further illustrative example, a reforming feed stream 16 may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Streams containing ethanol or other water-miscible alcohols will typically contain approximately 25-60 vol % alcohol and approximately 40-75 vol % water. An example of a particularly well-suited feed stream for hydrogen-generating assemblies that utilize steam reforming reactions contains 69 vol % methanol and 31 vol % water, although other compositions and liquid carbon-containing feedstocks may be used without departing from the scope of the present disclosure.

While not required, it is within the scope of the present disclosure that a feed stream that contains both water and at least one carbon-containing feedstock may be used as the feed stream for hydrogen-producing region 26. A potential benefit of such a construction is that the hydrogen generation assembly that produces hydrogen gas from water and a carbon-containing feedstock does not need to include more than a single supply 12, if the water and water-soluble liquid carbon-containing feedstock are premixed. It is also within the scope of the present disclosure that a feedstock delivery system 12 may deliver the components of the hydrogen production fluid, or feed stream, to the fuel processing assembly in two or more streams, with these streams having the same or different compositions. For example, the carbon-containing feedstock and water may be delivered in separate streams, and optionally (at least until both streams are vaporized or otherwise gaseous), when they are not miscible with each other, such as shown in FIG. 1 by reference numerals 18 and 20 optionally pointing to different feed streams.

Illustrative, non-exclusive examples of suitable feedstock delivery systems 12 that may be used with hydrogen-producing fuel processing assemblies (or hydrogen-generation assemblies) according to the present disclosure are disclosed in U.S. Patent Application Publication Nos. 2007/0062116, 2006/0090396, and 2006/0090397. The complete disclosures of the above-identified patent applications are hereby incorporated by reference. The above-incorporated applications also disclose additional examples of fuel processing assemblies, fuel cell systems, the components therefor, and methods for operating the same that may selectively be used and/or integrated with other components disclosed, illustrated and/or incorporated herein. Illustrative, non-exclusive examples of suitable hydrogen generation assemblies, and components thereof, are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference. Additional examples are disclosed in U.S. Patent Application Publication Nos. 2006/0060084 and 2007/0062116, the complete disclosures of each of which are hereby incorporated by reference.

As discussed, steam reforming hydrogen generation assemblies 10 according to the present disclosure may include at least one purification region 30. When present in a particular embodiment, it is within the scope of the present disclosure that the purification, or separation, region and hydrogen-producing region 26 may be housed together in a common shell, or housing, 50. It is within the scope of the present disclosure that the purification region is separately positioned relative to hydrogen-producing region 26, such as by being downstream thereof, but in fluid communication therewith to receive the mixed gas, or reformate, stream therefrom. It is also within the scope of the present disclosure that the hydrogen generation assembly does not include a purification region.

Purification region 30 may include any suitable mechanism, device, or combination of devices, that is adapted to reduce the concentration of at least one non-hydrogen component of output stream 28. In other words, the purification region may be adapted to reduce the concentration of at least one of the other gases produced in the hydrogen-producing region or otherwise present in output stream 28. In most applications, hydrogen-rich stream 32 will have a greater hydrogen concentration than output, or mixed gas, stream 28. However, it is also within the scope of the disclosure that the hydrogen-rich stream will have a reduced concentration of one or more non-hydrogen components that were present in output stream 28, yet have the same, or even a reduced overall, hydrogen gas concentration as the output stream. For example, in some applications where product hydrogen stream 24 may be used, certain impurities, or non-hydrogen components, are more harmful than others. As a specific example, in some conventional fuel cell systems, carbon monoxide may damage a fuel cell stack if it is present in even a few parts per million, while other non-hydrogen components that may be present in stream 28, such as water, will not damage the stack even if present in much greater concentrations. Therefore, in such an application, a suitable purification region may not increase the overall hydrogen gas concentration, but it will reduce the concentration of a non-hydrogen component that is harmful, or potentially harmful, to the desired application for the product hydrogen stream.

Illustrative, non-exclusive examples of suitable devices for purification region 30 include one or more hydrogen-selective membranes 52, chemical carbon monoxide removal assemblies 54 (such as a methanation catalyst bed), and pressure swing adsorption systems 56. Purification of hydrogen gas by the use of one or more hydrogen-selective membrane, pressure swing adsorption system, or other pressure-driven separation process occurs more efficiently under conditions of elevated pressure. Therefore, and as discussed herein, a temperature-responsive valve assembly according to the present disclosure may alter the hydrogen level in the byproduct and hydrogen-rich streams by its effect on the backpressure of an output stream from the hydrogen generation assembly. It is within the scope of the disclosure that purification region 30 may include more than one type of purification device and that these devices may have the same or different structures and/or operate by the same or different mechanisms.

An example of a suitable structure for use in purification region 30 is a membrane module 58, which typically includes or defines a pressure vessel that contains one or more hydrogen-selective membranes 52. Illustrative, non-exclusive examples of suitable membrane modules formed from a plurality of hydrogen-selective metal membranes are disclosed in U.S. Pat. No. 6,319,306, the complete disclosure of which is hereby incorporated by reference. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other illustrative, non-exclusive examples of suitable membranes and membrane modules are disclosed in the above-incorporated patents and applications, as well as U.S. Pat. Nos. 6,562,111 and 6,537,352, the complete disclosures of which are hereby incorporated by reference in their entirety. Membrane(s) 52 also may be integrated directly into the hydrogen-producing region or other portion of fuel processor 10.

The thin, planar, hydrogen-permeable membranes may be composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen-selective membrane or membranes may take other configurations as well, such as tubular configurations, which are disclosed in the incorporated patents.

Another example of a suitable pressure-separation process for use in purification region 30 is pressure swing adsorption, with a pressure swing adsorption assembly being indicated at 56. In a pressure swing adsorption process, gaseous impurities are removed from a stream containing hydrogen gas. Pressure swing adsorption is based on the principle that certain gases, under the proper conditions of temperature and pressure, will be adsorbed onto an adsorbent material more strongly than other gases. Typically, it is the impurities that are adsorbed and thus removed from reformate stream 28. The success of using pressure swing adsorption for hydrogen purification is due to the relatively strong adsorption of common impurity gases (such as carbon monoxide, carbon dioxide, hydrocarbons (including methane), and nitrogen) on the adsorbent material. Hydrogen adsorbs only very weakly and so hydrogen passes through the adsorbent bed while the impurities are retained on the adsorbent material. Impurity gases such as ammonia, hydrogen sulfide, and water adsorb very strongly on the adsorbent material and are therefore removed from stream 28 along with other impurities. If the adsorbent material is going to be regenerated and these impurities are present in stream 28, purification region 30 preferably includes a suitable device that is adapted to remove these impurities prior to delivery of stream 28 to the adsorbent material because it is more difficult to desorb these impurities.

Adsorption of impurity gases in pressure swing adsorption occurs at elevated pressure. When the pressure is reduced, the impurities are desorbed from the adsorbent material, thus regenerating the adsorbent material. Typically, pressure swing adsorption is a cyclic process and requires at least two beds for continuous (as opposed to batch) operation. Illustrative, non-exclusive examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

The components discussed in detail above need not be distant or distinct assemblies whose interaction is determined solely by fluid communication. As shown in FIG. 1, fuel processing assembly 14 may include a shell 50 in which at least the hydrogen-producing region, and optionally the purification region, is contained. Shell 50, which also may be referred to as a housing, enables the components of the steam reformer or other fuel processing mechanism to be moved as a unit. It also protects the components of fuel processing assembly 14 from damage by providing a protective enclosure and reduces the heating demand of the fuel processing assembly because the components of the fuel processing assembly may be heated as a unit. Shell 50 may, but is not required in all embodiments to, include insulating material 60, such as a solid insulating material, blanket insulating material, and/or an air-filled cavity. It is within the scope of the disclosure, however, that the fuel processing assembly may be formed without a housing or shell. When fuel processing assembly 14 includes insulating material 60, the insulating material may be internal the shell, external the shell, or both. When the insulating material is external a shell containing the above-described reforming and/or purification regions, fuel processing assembly 14 further may include an outer cover or jacket external the insulation it is within the scope of the present disclosure that the fuel processing assembly may be implemented with a different shell, with a shell that includes additional components of the fuel processing assembly, including feedstock delivery system 12 (or portions thereof), and/or includes additional components of the fuel cell system. It is also within the scope of the present disclosure that a fuel processing assembly 14 may not include a shell 50.

It is further within the scope of the disclosure that one or more of the components of fuel processing assembly 14 may either extend beyond the shell or be located external at least shell 50. For example, and as discussed, purification region 30 may be located external shell 50, such as with the purification region being coupled directly to the shell or being spaced-away from the shell but in fluid communication therewith by suitable fluid-transfer conduits. As another example, a portion of hydrogen-producing region 26 (such as portions of one or more reforming catalyst beds) may extend beyond the shell.

Figure 2:
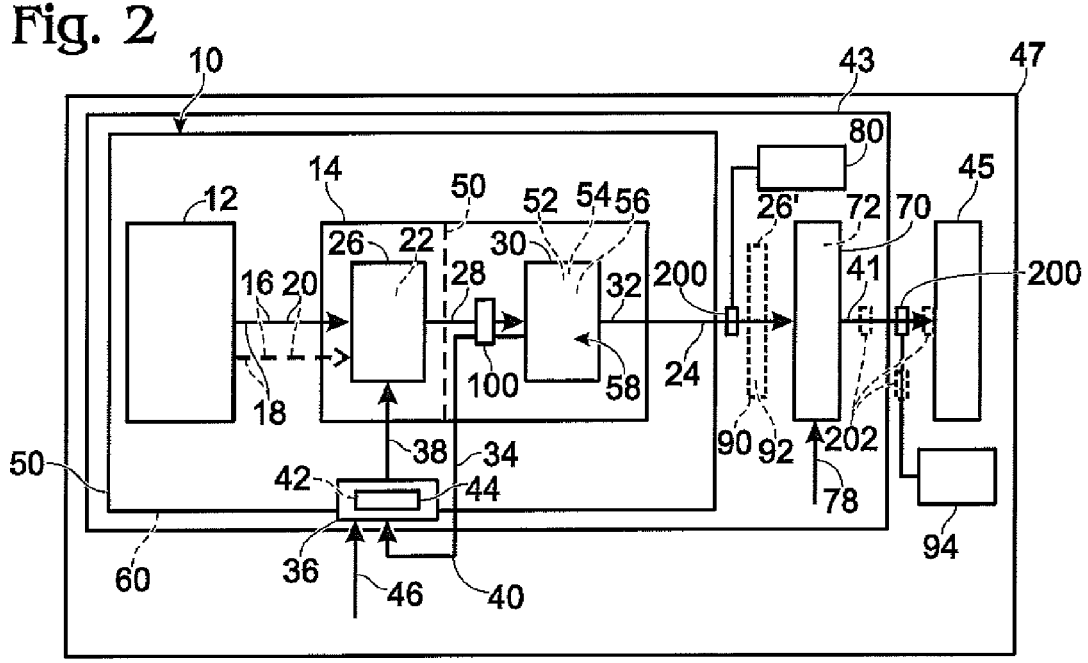
FIG. 2 is a schematic view of another illustrative hydrogen-generating fuel cell system according to the present disclosure.

As discussed, product hydrogen stream 24 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, hydrogen generation assembly 10 may include or be coupled to at least one fuel cell stack 70, which is adapted to receive at least a portion of product hydrogen stream 24 and an air or other oxidant stream 78 to produce an electrical power output therefrom. This is schematically illustrated in FIGS. 1 and 2, in which a fuel cell stack is indicated at 70 and produces an electric current, or electrical output, which is schematically illustrated at 41. Air stream 78 may be delivered to the fuel cell stack via any suitable mechanism, including passive or active mechanisms, and powered or manual mechanisms. When coupled to a fuel cell stack 70, the steam reforming hydrogen generation assembly may be referred to as an energy producing system, or a steam reforming fuel cell system, 43. In the illustrated embodiment, a single fuel processing assembly 14 and a single fuel cell stack 70 are shown and described, however, more than one of either or both of these components may be used. These components have been schematically illustrated, and a fuel cell system may include additional components that are not specifically illustrated in the figures, such as feed pumps, air delivery systems, heat exchangers, and the like. The present application incorporates by reference many different patents and patent applications that disclose fuel processing assemblies, fuel cell systems, or components thereof. It is within the scope of the present disclosure that these systems and components, including the variations disclosed, illustrated, and incorporated therein and herein may be selectively combined and used or integrated together without departing from the scope of the present disclosure.

Fuel cell stack 70 includes at least one fuel cell 72, and typically includes a plurality of fuel cells 72 that are adapted to produce an electric current from an oxidant, such as air, oxygen-enriched air, or oxygen gas, and the portion of the product hydrogen stream 24 delivered thereto. Illustrative, non-exclusive examples of suitable fuel cells include proton exchange membrane (PEM) fuel cells and alkaline fuel cells. Others include solid oxide fuel cells, phosphoric acid fuel cells, and molten carbonate fuel cells.

Fuel cell stack 70 may have any suitable construction. Illustrative, non-exclusive examples of fuel cell systems, fuel cell stacks, and components thereof, that may be utilized in hydrogen-producing fuel cell systems that include a hydrogen-producing fuel processing assembly according to the present disclosure, are disclosed in U.S. Pat. Nos. 4,214,969, 4,583,583, 5,300,370, 5,484,666, 5,879,826, 6,057,053, and 6,403,249, the complete disclosures of which are hereby incorporated by reference. Additional examples are disclosed in U.S. Patent Application Publication Nos. 2006/0093890 and 2006/0246331, the complete disclosures of which are hereby incorporated by reference.

It is within the scope of the present disclosure that steam reforming hydrogen generation assemblies 10 according to the present disclosure may be used in other applications in which it is desirable to have a source of hydrogen gas and/or may be used to produce hydrogen gas for storage and later consumption. In other words, while hydrogen generation assemblies 10 according to the present disclosure may be utilized with fuel cell stacks to provide a fuel cell system for satisfying an applied electrical load, it is also within the scope of the present disclosure that the hydrogen generation assemblies may be utilized independent of fuel cell stacks.

Energy producing, or fuel cell, system 43 may be adapted to supply power to meet the applied load from at least one energy-consuming device 45. Illustrative, non-exclusive examples of energy-consuming devices include, but should not be limited to, motor vehicles, recreational vehicles, construction or industrial vehicles, boats and other sea craft, and any combination of one or more residences commercial offices or buildings, neighborhoods, tools, lights and lighting assemblies, radios, appliances (including household appliances), computers, industrial equipment, signaling and communications equipment, radios, electrically powered components on boats, recreational vehicles or other vehicles, battery chargers, autonomous battery chargers, mobile devices, mobile tools, emergency response units, life support equipment, monitoring equipment for patients, and even the balance-of-plant electrical requirements for the energy-producing system 43 of which fuel cell stack 70 forms a part. As used herein, energy-consuming device 45 is used to schematically and generally refer to one or more energy-consuming devices that are adapted to draw power from an energy producing system, or fuel cell system, according to the present disclosure. It is also within the scope of the present disclosure that an energy-producing system according to the present disclosure, including such a system that includes a steam reforming hydrogen generation assembly (or hydrogen-producing fuel processing assembly) according to the present disclosure, may be integrated or otherwise coupled to, or commonly housed within, at least one energy-consuming device, as illustrated schematically at 47.

In the context of a portable energy producing system that includes a steam-reforming hydrogen-producing assembly according to the present disclosure, the rate at which the hydrogen generation assembly is adapted to produce hydrogen gas, and the rated power output of fuel cell stack 70 contribute to or otherwise define the number and/or type of energy-consuming devices that system 43 may be adapted to power. Therefore, although not required by all fuel energy producing systems (or hydrogen-producing fuel cell systems), including (but not limited to) smaller, portable energy producing systems according to the present disclosure, the system may be designed or otherwise configured to have a rated/intended maximum power output, and corresponding hydrogen gas production rate, of 1000 watts or less. In some embodiments, the system may be designed or otherwise configured to have a rated/intended maximum power output, and corresponding hydrogen gas production rate, and in some embodiments to have a rated/intended maximum power output of 500 watts or less. In some embodiments, the system may be designed or otherwise configured to have a rated/intended maximum power output, and corresponding hydrogen gas production rate, of 300 watts or less, or even 250 watts. The systems will typically have a rated, or maximum, power output of at least 100 watts, although this is not a requirement of all embodiments.

Illustrative, non-exclusive examples of power outputs of 1000 watts or less that may be utilized by systems according to the present disclosure include, but should not be limited to 500-800 watts, 500-750 watts, 750-1000 watts, 200-500 watts, 250-500 watts, 300-600 watts, and 400-800 watts. Illustrative, non-exclusive examples of power outputs of 500 watts or less that may be utilized by systems according to the present disclosure include, but should not be limited to, 25-500 watts, 50-200 watts, 50-250 watts, 150-250 watts, 350-450 watts, 100-400 watts, 100-300 watts, and 250-450 watts. Illustrative, non-exclusive examples of power outputs of 300 watts or less that may be utilized by systems according to the present disclosure include, but should not be limited to, 100-300 watts, 75-300 watts, 100-200 watts, 200-300 watts, 150-300 watts, and 250-300 watts. While not required, these systems may be relatively lightweight and compact, such as being sized for manual transport by an individual.

When fuel cell systems 43 are adapted to have a rated power output of 1 kW or less, such as discussed above, the corresponding hydrogen generation assembly 10 may be configured to provide an appropriate flow rate of hydrogen gas in product hydrogen stream 24 to enable the fuel cell stack, or stacks, to produce this power output. For example, the hydrogen generation assemblies illustrated herein may be adapted to produce less than 20 slm (standard liters per minute) of hydrogen gas when operating at full capacity, with illustrative subsets of this range including less than 15 slm, less than 10 slm, less than 5 slm, 13-15 slm, 3-5 slm, and 2-4 slm of hydrogen gas. For a fuel cell system 43 that is rated to produce 250 watts/hr, an illustrative, non-exclusive example of a suitable capacity for hydrogen generation assembly 10 is 3-4 slm of hydrogen gas.

However, it is within the scope of the present disclosure that steam reforming hydrogen generation assemblies (and energy-producing systems incorporating the same) according to the present disclosure may be constructed to any suitable scale, such as depending upon the desired flow rate of hydrogen gas in product hydrogen stream 24, the desired rated output of the energy producing system, the type and/or number of energy-consuming devices to be powered by the energy producing assembly, limitations on available size for the hydrogen generation assembly and/or the energy production assembly, etc. In some embodiments, it may be desirable to produce energy-production assemblies according to the present disclosure that have a rated (designed) power output of at least 1 kW, such as in the range of 1-2 kW, with the assembly including a hydrogen generation assembly adapted to provide the requisite hydrogen gas to produce the required electricity to satisfy such an applied load. In other applications, it may be desirable for the assembly to have a power output of at least 2 kW, such as in the range of 2-4 kW, 3-5 kW, 4-6 kW, 10 kW, or more. For example, such a fuel cell system may be used to provide power to a household or other residence, small office, or other energy-consuming device with similar energy requirements.

It is within the scope of the present disclosure that embodiments of steam reforming hydrogen generation assemblies, fuel processing assemblies, startup assemblies, feedstock delivery systems, fuel cell stacks, and/or fuel cell systems that are disclosed, illustrated and/or incorporated herein may be utilized in combinations of two or more of the corresponding components to increase the capacity thereof. For example, if a particular embodiment of a hydrogen generation assembly is adapted to produce 3-4 slm of hydrogen gas, then two such assemblies may be used to produce 6-8 slm of hydrogen gas. Accordingly, the assemblies and systems disclosed herein may be referred to as scalable systems. It is within the scope of the present disclosure that the hydrogen generation assemblies, fuel processing assemblies, startup assemblies, fuel cell stacks, fuel processing assemblies, and/or heating assemblies described, illustrated, and/or incorporated herein may be configured as modular units that may be selectively interconnected.

Fuel cell stack 70 may receive all of product hydrogen stream 24. Some or all of stream 24 may additionally, or alternatively, be delivered, via a suitable conduit, for use in another hydrogen-consuming process, burned for fuel or heat, or stored for later use. As an illustrative, non-exclusive example, a hydrogen storage device 80 is shown in FIGS. 1 and 2. Device 80 is adapted to store at least a portion of product hydrogen stream 24. For example, when the demand for hydrogen gas by stack 70 is less than the hydrogen output of fuel processing assembly 14, the excess hydrogen gas may be stored in device 80. Illustrative, non-exclusive examples of suitable hydrogen storage devices include hydride beds and pressurized tanks. Although not required, a benefit of fuel processing assembly 14 or fuel cell system 43 including a supply of stored hydrogen gas is that this supply may be used to satisfy the hydrogen requirements of stack 70, or the other application for which stream 24 is used, in situations when fuel processing assembly 14 is not able to meet these hydrogen demands. Examples of these situations include when the fuel processing assembly is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processing assembly. Additionally or alternatively, the stored hydrogen gas may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

As indicated by the dashed lines in FIGS. 1 and 2, reformer 14 may, but need not, include a polishing region 90. As shown, polishing region 90 receives hydrogen-rich stream 32 from purification region 30 and further purifies the stream by reducing the concentration of, or removing, selected compositions therein. For example, when stream 32 is intended for use in a fuel cell stack, such as stack 70, compositions that may damage the fuel cell stack, such as carbon monoxide and carbon dioxide, may be removed from the hydrogen-rich stream. The concentration of carbon monoxide may be reduced to be less than 10 ppm (parts per million), less than 5 ppm, or less than 1 ppm. The concentration of carbon dioxide typically may be greater than that of carbon monoxide. For example, concentrations of less than 25% carbon dioxide, less than 10%, less than 1%, or less than 50 ppm may be acceptable. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein. Similarly, when fuel processor 14 is not used with a fuel cell stack, or when it is used with a fuel cell stack that is more tolerant of these impurities, then the product hydrogen stream may contain larger amounts of these gases.

Polishing region 90 includes any suitable structure for removing or reducing the concentration of the selected compositions in stream 32. For example, when the product stream is intended for use in a PEM fuel cell stack or other device that will be damaged if the stream contains more than determined concentrations of carbon monoxide or carbon dioxide, it may be desirable to include at least one methanation catalyst bed 92. Bed 92 converts carbon monoxide and carbon dioxide into methane and water, both of which will not damage a PEM fuel cell stack. Polishing region 90 may also include another hydrogen-producing region 26', such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed. Polishing region 90 also may be described as another example of a purification region, and may be used alone or in combination with other purification regions that are described, illustrated, and/or incorporated herein.

Hydrogen generation assemblies 10 and/or fuel cell systems 43 according to the present disclosure may (but are not required to) also include a battery or other suitable electricity-storage device 94. Device 94 may additionally or alternatively be referred to as an energy storage device. Device 94 may be adapted to provide a power output to satisfy at least a portion of the balance of plant requirements of assemblies 10 and/or systems 43 (such as to provide power to feedstock delivery system 12). Device 94 may additionally or alternatively be adapted to satisfy at least a portion of the applied load to fuel cell system 43, such as when the fuel cell stack is not producing an electric current and/or not able to satisfy the applied load. In some embodiments, device 94 may be a rechargeable device that is adapted to store at least a portion of the electric potential, or power output, produced by fuel cell stack 70. Similar to the above discussion regarding excess hydrogen gas, fuel cell stack 70 may produce a power output in excess of that necessary to satisfy the load exerted, or applied, by device 45, including the load required to power fuel cell system 43.

In further similarity to the above discussion of excess hydrogen gas, this excess power output may be used in other applications outside of the fuel cell system and/or stored for later use by the fuel cell system. For example, the battery or other storage device may provide power for use by system 43 during startup or other applications in which the system is not producing electricity and/or hydrogen gas.

In FIGS. 1 and 2, flow-regulating structures are generally indicated at 200 and schematically represent any suitable manifolds, valves, controllers, switches, buses, and the like for selectively delivering hydrogen gas and/or the fuel cell stack's power output to hydrogen-storage device 80 and energy-storage device 94, respectively, and to draw the stored hydrogen gas and stored power output therefrom.

As indicated in dashed lines at 202 in FIGS. 1 and 2, the fuel cell system may, but is not required to, include at least one power management module 202. Power management module 202 includes any suitable structure for conditioning or otherwise regulating the electrical output produced by the fuel cell system, such as for delivery to energy-consuming device 45.

Power management module 202 may include such illustrative structure as buck and/or boost converters, switches, inverters, relays, power filters, and the like.

It is within the scope of the present disclosure that steam reforming hydrogen generation assemblies and/or fuel cell systems according to the present disclosure may be free from computerized controllers and control systems. In such an embodiment, the system may be less complex in that it may not include as many sensors, communication linkages, actuators, and the like, and it may have lower balance of plant requirements than a comparable assembly or system that includes a controller However, in some embodiments, it may be desirable to include a controller, such as to automate one or more operations of the assembly or system, to regulate the operation of the assembly or system, etc.

An aspect of the present hydrogen-producing fuel cell systems that may be free from computerized controllers and computerized control systems is a feedback device that is configured to regulate, or modulate, the performance of the hydrogen-producing region 26. As discussed above, a temperature-sensitive, or temperature-responsive, valve assembly 100 may be configured to provide automatic, non-computer-implemented, feedback control of the heating of the hydrogen production region 26 in response to the temperature of the gas stream with which the valve assembly is in thermal communication. For example, when the temperature of the stream(s) to which the valve's position is correlated is hotter than a predetermined, or preselected, threshold temperature or temperature range, the valve may automatically respond to this excessive temperature by reducing the flow rate of the byproduct stream from the purification region to the heating assembly. This reduction in flow rate of the byproduct stream may cause the pressure in the purification region's output stream region to increase (i.e. the "backpressure" of the system, or pressure upstream of the valve assembly, may increase). This may increase the pressure differential between the output stream and hydrogen-rich stream regions of the purification region, which thereby may increase the amount of hydrogen gas in the hydrogen-rich stream, which may thereby reduce the amount of hydrogen gas in the byproduct stream, which thereby may reduce the fuel value of the byproduct stream, which thereby may reduce the heating assembly's burner output, which may thereby reduce the temperature of the hydrogen-producing region, which may thereby reduce the temperature of the corresponding stream that triggered the whole temperature-responsive adjustment process.

Similarly, the temperature-responsive valve assembly 100 may provide an automatic, non-computer implemented feedback response if the temperature of the stream(s) to which the valve's position is correlated is colder than a predetermined, or preselected, threshold temperature or temperature range. The valve may automatically respond, in the absence of a typical microprocessor-based controller, to the reduced temperature of the stream by increasing the flow rate of the byproduct stream from the purification region. This increase in the flow rate of the byproduct stream may cause the pressure in the purification region's output stream region to decrease (i.e. the "backpressure" of the system, or pressure upstream of the valve assembly, may decrease). This decreases the pressure differential between the output stream and hydrogen-rich stream regions of the purification region, which thereby decreases the amount of hydrogen gas in the hydrogen-rich stream, which thereby increases the amount of hydrogen gas in the byproduct stream, which thereby increases the fuel value of the byproduct stream, which thereby increases the heating assembly's burner output, which thereby increases the temperature of the hydrogen-producing region, which thereby increases the temperature of the corresponding stream that triggered the whole adjustment process.

The streams whose temperature may be used to induce an automatic response of the temperature-responsive valve assembly include at least one or more of: byproduct stream 34 from the purification region, hydrogen-rich (or permeate) stream 32 from the purification region, and/or output (or reformate) stream 28 from the hydrogen-production region, among others. In some applications, the valve assembly may have a quicker response time if its position is correlated to the temperature of the output (mixed gas) stream, such as if the output stream flows through at least a portion of the valve assembly. Specifically, because this gas stream exits the purification region, its temperature is more closely correlated to the temperature of the purification region than the product hydrogen stream or the byproduct stream. However, and as indicated above, valve assemblies 100 according to the present disclosure may additionally or alternatively be configured to be responsive to the temperatures of other gas streams.

Figure 3:
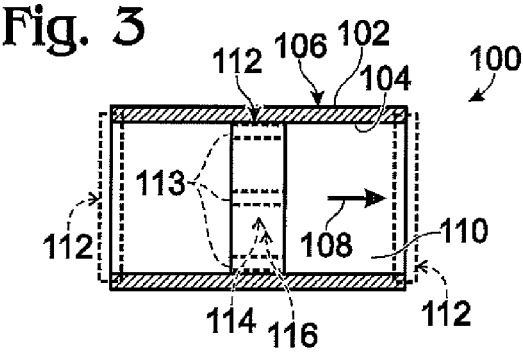
FIG. 3 is a schematic view of a temperature-responsive valve assembly that may be used with hydrogen generation assemblies according to the present disclosure.

A schematic representation of a suitable construction for a temperature-responsive valve assembly and/or a conduit in the hydrogen producing region is shown in FIG. 3 and generally indicated at 100. In the illustrated, non-exclusive example, temperature-responsive valve assembly 100 includes a shell 106 with an outer wall 102 and an inner wall 104. The inner wall defines a valve conduit, or valve passage, 110, which is designed or adapted to entrain a gas flow 108 therein as a gas stream flows through the temperature-responsive valve assembly. By "entrain," it is meant that the cavity, or conduit, that is within the shell defines, or bounds, a passage for the gas flow. The gas flowing through the conduit will be in thermal contact, or thermal communication, with at least a portion of the shell as the gas flow passes through the conduit. As this occurs, the gas flow will communicate, or transfer, at least a portion of its heat content to the shell. Shell 106 may additionally or alternatively be referred to as the body, or housing, of temperature-responsive valve assembly 100.

The temperature-responsive valve assembly 100 includes a restrictive assembly 112 that is configured to selectively and automatically regulate whether, and the degree to which, an entrained gas flow 108 may pass through, or by, the restrictive assembly, such as through one or more valve orifices 113. In FIG. 3, illustrative, non-exclusive examples of valve orifices 113 are shown in dashed lines extending between the restrictive assembly and the inner wall 104 of the shell and through the restrictive assembly, which additionally or alternatively may be described as extending between opposed portions of the restrictive assembly. In FIG. 3, the restrictive assembly is schematically illustrated in solid lines as being generally centrally located within the valve assembly, but this is not required to all embodiments. For example, it is also within the scope of the present disclosure that the restrictive assembly is positioned at an end region of the valve assembly, such as at an inlet or outlet of the valve assembly As an illustrative, non-exclusive example, the restrictive assembly 112 may be housed or supported completely within the passage 110 through which the entrained gas stream flows. As another illustrative, non-exclusive example, the restrictive assembly 112 may be housed within, but to one side of the passage and/or partially within the conduit shell. As a further illustrative, non-exclusive example, the restrictive assembly may extend at least partially beyond, or external, the passage and/or shell of the corresponding temperature-responsive valve assembly. To graphically depict this range of suitable positions, in FIG. 3 a restrictive assembly 112 is schematically illustrated in dashed lines proximate the inlet and outlet of temperature-responsive valve assembly 100.

As discussed, the relative size of the one or more valve orifices 113 will change responsive at least to the temperature of the restrictive assembly, which may be responsive to the temperature of the gas flow in the valve assembly. As an illustrative, non-exclusive example, restrictive assembly 112 may define one or more valve orifices that collectively permit a sufficient gas flow 108 through the valve assembly to maintain the hydrogen-producing region of the fuel processing assembly at a predetermined, or preselected, hydrogen-producing temperature when the gas flow is combusted to produce a heated exhaust stream. When the temperature of the restrictive assembly is increased, the restrictive assembly may automatically respond by decreasing the size of one or more valve orifices and thereby reducing the amount of gas which may flow therethrough per unit time, which in turn reduces the flow of combustible gas to form the heated exhaust stream, which in turn reduces the temperature of the hydrogen-producing region. Similarly, when the temperature of the restrictive assembly is decreased, the restrictive assembly may automatically respond by increasing the size of one or more valve orifices and thereby increasing the amount of gas which may flow therethrough per unit time, which in turn increases the flow of combustible gas to form the heated exhaust stream, which in turn increases the temperature of the hydrogen-producing region. In some embodiments, restrictive assembly may be configured to permit gas to flow through the valve assembly regardless of the temperature of the restrictive assembly with the restrictive assembly thereby regulating the amount of gas that may flow through the valve assembly per unit time, not whether gas may flow through the valve assembly. In other embodiments, the restrictive assembly may include a range of relative configurations that includes not only a variety of sizes of valve orifice(s), but also a configuration in which the one or more valve orifices are closed or otherwise obstructed to prevent gas from flowing through the valve assembly.

In FIG. 3, restrictive assembly 112 is schematically illustrated and includes a valve member, or obstructive element, 114, whose relative position and/or orientation with respect to a second portion of the restrictive assembly determines whether, and the degree to which, gas may flow through the valve assembly. This second portion of the restrictive assembly may be referred to as a support, or base, member 116 of the restrictive assembly and may have any suitable structure for selectively defining with the obstructive element the one or more valve orifices responsive to relative movement of the obstructive element and the base member. Illustrative, non-exclusive examples of suitable structures for support member 116 include the shell of the valve assembly, an internal projection or flange that extends into conduit 110 of the valve assembly, a region of the obstructive element, a neck or collar that restricts the cross-sectional area of the shell's passage, a coupling that it attached to or adjacent an inlet or outlet of the valve assembly's passage, another obstructive element, etc. In other words, the particular structure that cooperates with the obstructive element to selectively and automatically define whether and the degree to which gas may flow through the temperature-responsive valve assembly is not critical so long as such structure is present. Accordingly, it is within the scope of the present disclosure that the obstructive member may expand or contract, lengthen or shorten, and/or deflect or bend relative to the support member to define the relative size of the one or more valve orifices. Additionally or alternatively, two or more obstructive members, or regions of the obstructive member, may move toward or away from each other, toward or away from the inner wall of the shell, etc. to define the relative size of the one or more valve orifices. The one or more valve orifices may be referred to as a valve orifice assembly, and the "size" referred to herein is intended to refer to the cross-sectional area of the valve orifice assembly through which gas may flow, such as measured transverse to the (laminar or normalize) direction of gas flow through the orifice assembly.

As discussed, this relative configuration of the restrictive assembly 112 of valve assembly 100 is automatic and does not require electrical, computer-implemented, manual, hydraulic, or other control signals or commands. Instead, the response is automatic and is responsive to at least the temperature of the gas stream of interest. The relative movement of the restrictive assembly may be imparted via any suitable mechanism, including the materials from which the restrictive assembly is formed and/or the coefficients of thermal expansion thereof. For example, the obstructive member may have a sufficiently dissimilar coefficient of thermal expansion relative to the support member (at least within a predetermined temperature range that includes a temperature within which the valve assembly permits sufficient gas flow therethrough to maintain the hydrogen-producing region at a suitable hydrogen-producing temperature) to respond to changes in temperature by changing the size of the one or more valve orifices as the obstructive member and the support member move relative to each other due to this difference in coefficients of thermal expansion. This relative movement may be by the obstructive element alone, or by the obstructive member and the support member. As an illustrative, non-exclusive example of suitable materials, stainless steel 304 and Kovar (a nickel-cobalt ferrous alloy) are examples of materials that are suitable for use for the obstructive member and support member of a restrictive assembly 112 of a temperature-responsive valve assembly 100 according to the present disclosure, with SS 304 having a relatively high coefficient of thermal expansion (GTE) compared to Kovar. Additionally or alternatively, at least the obstructive member may be formed from a bimetallic material that bends or otherwise changes its relative orientation with respect to the support member responsive to changes in temperature.

Figure 4:
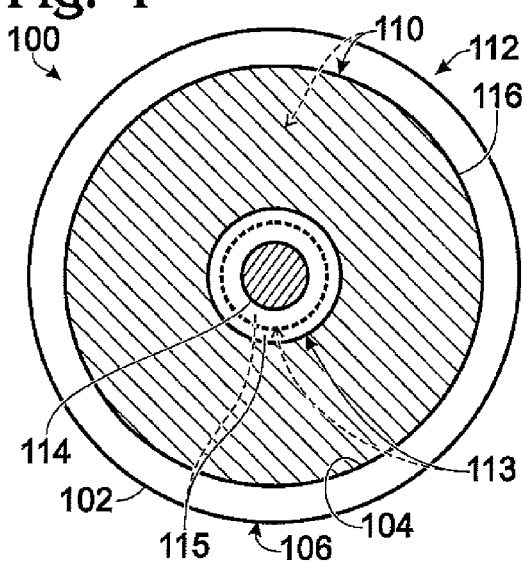
FIG. 4 is a schematic cross-sectional view of a temperature-responsive valve assembly that may be used with hydrogen generation assemblies according to the present disclosure.
Figure 5:
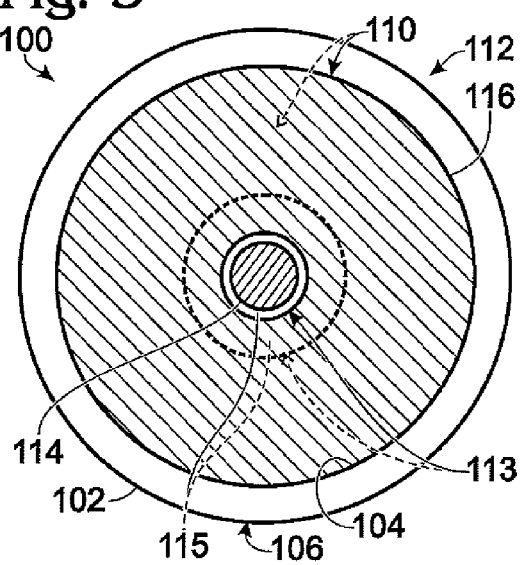
FIG. 5 is a schematic cross-sectional view of FIG. 4 depicting the restrictive assembly of the valve assembly at a different temperature than represented in FIG. 4.

FIGS. 4 and 5 provide a graphical illustration of how the relative differences in CTE's between the obstructive member and the support member may automatically adjust the size of a valve orifice 113 and thereby regulate the relative flow rate of gas therethrough. In FIG. 4, a portion of a temperature-responsive valve assembly 100 is shown in cross-section. As shown, the valve assembly includes shell 106, which includes an outer wall 102 and an inner wall 104, which defines, or bounds, a valve passage 110 through the valve assembly. The shell is shown in this schematic example as having a circular cross-sectional configuration, but this is not required to all embodiments. Somewhat schematically illustrated in FIGS. 4 and 5 is a restrictive assembly 112 having an obstructive member 114 that extends through an opening 115 in a support member 116, which in the illustrative example is shown extending from inner wall 104 into passage 110. The open area between the obstructive member and the support member represents valve orifice 113. For the purposes of illustration, consider that the configuration shown schematically in FIG. 4 represents the temperature-responsive valve assembly when a corresponding hydrogen-producing region of a fuel processing assembly is at a suitable hydrogen-producing temperature for producing the reformate stream, with the byproduct stream from a purification region being fluidly connected to the valve assembly to flow therethrough. Accordingly, the temperature of the byproduct stream affects the temperature of the restrictive assembly's obstructive member and support member.

In FIG. 5, the schematically illustrated valve assembly from FIG. 4 is shown depicting a change in the temperature of the restrictive assembly, such as responsive to the byproduct stream having a higher temperature than was represented in FIG. 4. As shown in FIG. 5, the relative size of the valve orifice has decreased from the example of FIG. 4. Accordingly, in such an embodiment, less of the byproduct stream may flow through the valve assembly to a burner or other heating assembly that receives the byproduct stream as a combustible fuel stream for heating the hydrogen-producing region. This creates backpressure in the fuel processing assembly and reduces the temperature of the hydrogen-producing region. As the hydrogen-producing region cools, the temperature of the byproduct stream will also cool, which will therefore cool the restrictive assembly and thereby return the size of the valve assembly toward the position shown in FIG. 4. An analogous but opposite effect may occur when the temperature of the byproduct stream decreases from the temperature represented in FIG. 4, such as is indicated in dashed lines in FIG. 5.

In this depicted graphical example, the relative size of the support member is shown changing more significantly than any change in the obstructive member, such as represented by the decrease in the cross-sectional area of opening 115 as the support member is heated. This would represent a support member being formed from a material having a greater CTE than the restrictive member. It is within the scope of the present disclosure that this relationship may be reversed for some restrictive assemblies 112 according to the present disclosure. This is schematically depicted in FIG. 4 in dashed lines, in which dashed line 112 represents obstructive member 112 in an enlarged configuration, such as which may occur if the obstructive member is heated from the configuration shown in solid lines and if the obstructive member has a greater CTE than the support member. It is additionally or alternatively within the scope of the present disclosure that the relative size of the valve assembly may include changes in both the axial and transverse (and/or lateral and longitudinal) directions.

FIGS. 4 and 5 schematically illustrate that the restrictive assembly may function to obstruct passage 110 to a greater extent under one set of operating conditions, and to a lesser extent under another set of operating conditions. These operating conditions may be described as active configurations of the restrictive assembly, as they may correspond to configurations of the restrictive assembly when the restrictive assembly is heated by a gas stream of interest. It follows that the range of relative positions of the components of restrictive assembly 112 may also have an inactive configuration, which refers to the relative position of the restrictive assembly, and thus the size of the one or more valve orifices, when the temperature-responsive valve assembly is not being heated, such as by a gas stream of interest. The reversible and automatic transition from an inactive configuration to an active conformation, and vice versa, may be actuated by the delivery of a gas stream of interest in thermal communication with the valve assembly, and the reversible and automatic transition between a plurality of active configurations, including those described above, may be actuated by a change in the non-zero flow rate of the gas stream of interest, such as through the temperature-responsive valve assembly 100. The temperature-responsive valve assembly 100 may assume reversibly these active and inactive conformations (or any one of the continuum of positions between them), in the absence of external control signals, with the conformational transition depending on the temperature of the restrictive assembly's constituent materials.

Reference has been made to the restriction of the flow rate of gas, such as of the byproduct stream, through the valve assembly creating backpressure in the fuel processing assembly upstream of the temperature-responsive valve assembly. The degree to which the backpressure is created is not critical to the present disclosure so long as continued operation of the fuel processing assembly is permitted during use of the valve assembly when the components of the fuel processing assembly are otherwise operating within acceptable parameters. In some embodiments, the temperature-responsive valve assembly may be configured to create at least 0.25 psi of backpressure per degree (Celsius) of temperature change in the restrictive assembly. Other illustrative, non-exclusive examples of backpressure which the temperature-responsive valve assembly may be configured to create include at least 0.4 psi/° C., at least 0.5 psi/° C., at least 0.8 psi/° C., at least 1 psi/° C., at least 1.2 psi/° C., at least 2 psi/° C., 0.25-0.75 psi/° C., 0.5-1.5 psi/° C., and 1-2.5 psi/° C. It is further within the scope of the present disclosure that the restrictive assembly may be an adjustable restrictive assembly, in that the relative orientation and/or range of movement of the obstructive member and the support member may be selected by a user prior to use of the valve assembly.

In the schematic, non-exclusive example of a temperature-responsive valve assembly 100 shown in FIG. 3, the gas stream of interest and the subject gas stream are the same stream, which flows as gas flow 108 through passage 110. It is also within the scope of the present disclosure that the configuration of the valve assembly's restrictive assembly is defined at least in part by the temperature of another fluid stream within the fuel processing assembly, such as the temperature of a gas stream of interest that is not flowing through passage 110. For example, and as discussed, the temperature-responsive valve assembly may include a shell that defines the previously discussed passage 110 for entraining as gas flow 108 the subject gas stream whose flow is regulated automatically by the restrictive assembly. The shell may further define a second passage 210 that entrains as a second gas flow 208 a gas stream of interest that is in thermal communication with the restrictive assembly. Accordingly, the temperature of the gas stream of interest flowing through passage 210 may affect the configuration of the valve assembly's restrictive assembly and thereby affect the degree to which the subject gas stream is restricted from flowing through the restrictive assembly's valve orifice assembly 113.

Figure 6:
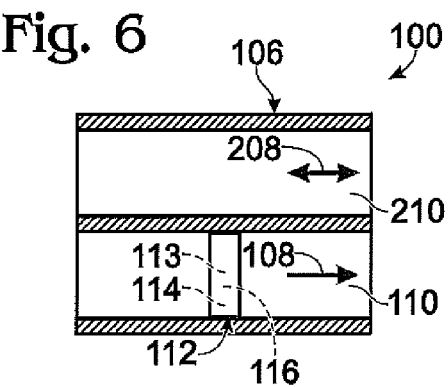
FIG. 6 is a schematic view of another temperature-responsive valve assembly that may be used with hydrogen generation assemblies according to the present disclosure.
Figure 7:
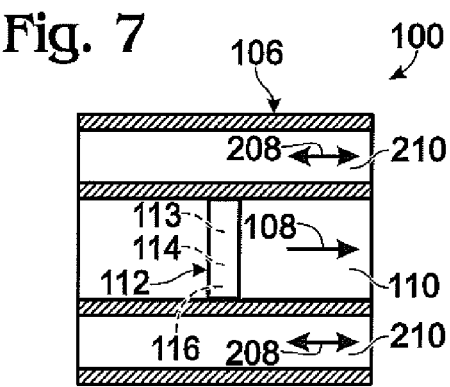
FIG. 7 is a schematic view of another temperature-responsive valve assembly that may be used with hydrogen generation assemblies according to the present disclosure.

Illustrative, non-exclusive examples of such temperature-responsive valve assemblies 100 are shown in FIGS. 6 and 7. In FIG. 6, shell 106 defines passages 110 and 210, which extend parallel (or generally parallel) to each other in a laterally spaced relationship. In FIG. 7, shell 106 incorporates a shell-and-tube construction in which passage 110 extends within, but fluidly isolated from, passage 210 in a nested arrangement. Gas flows 108 and 208 may flow through passages 110 and 210, respectively, in co-current or countercurrent directions. FIG. 7 may additionally or alternatively be described as schematically representing a valve assembly 100 in which the gas stream of interest flows on opposing sides of the passage within which the subject gas stream flows. In the schematically illustrated FIGS. 3 and 6-7, the passages have been illustrated as linear passages. However, it is within the scope of the present disclosure that any suitable geometry, or relative geometry, may be utilized, such as arcuate passages, helical or coiled passages, etc. In addition, the temperature-responsive valve assembly 100 may be in thermal communication with any apparatus or fluid flow whose temperature is correlated to performance of the hydrogen-producing region of a corresponding fuel processing assembly.

Figure 8:
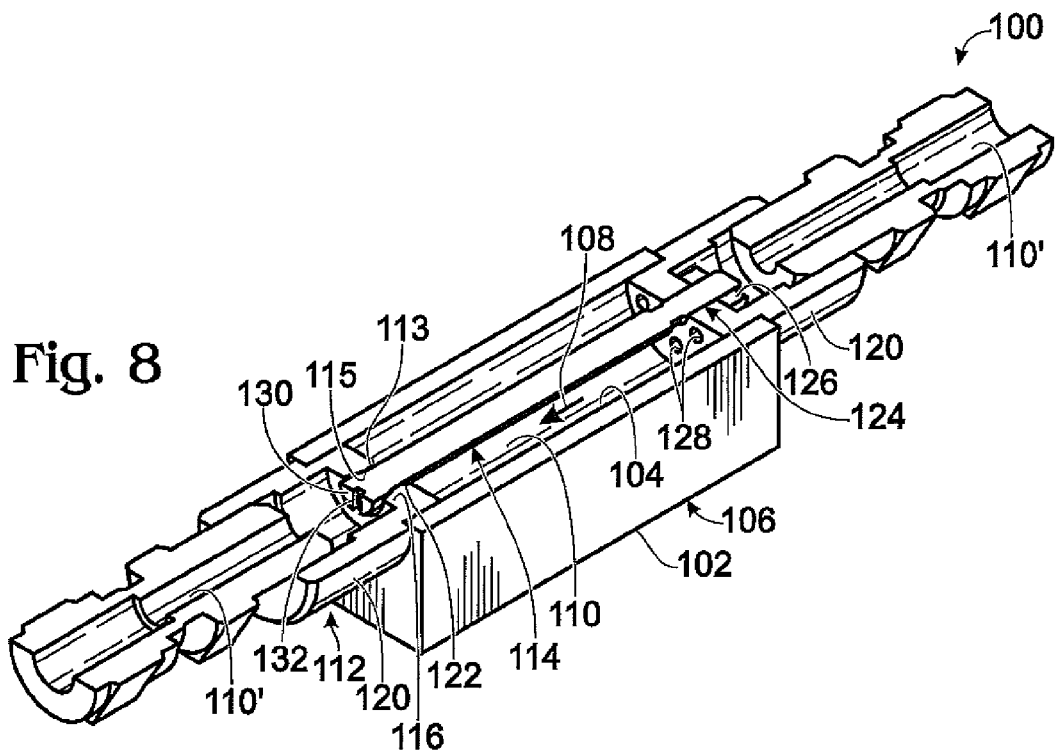
FIG. 8 is a cross-sectional view of another temperature-responsive valve assembly according to the present disclosure and which may be configured to utilize the byproduct stream from a purification region as the gas stream of interest to regulate the flow of the byproduct stream through the valve assembly.
Figure 9:
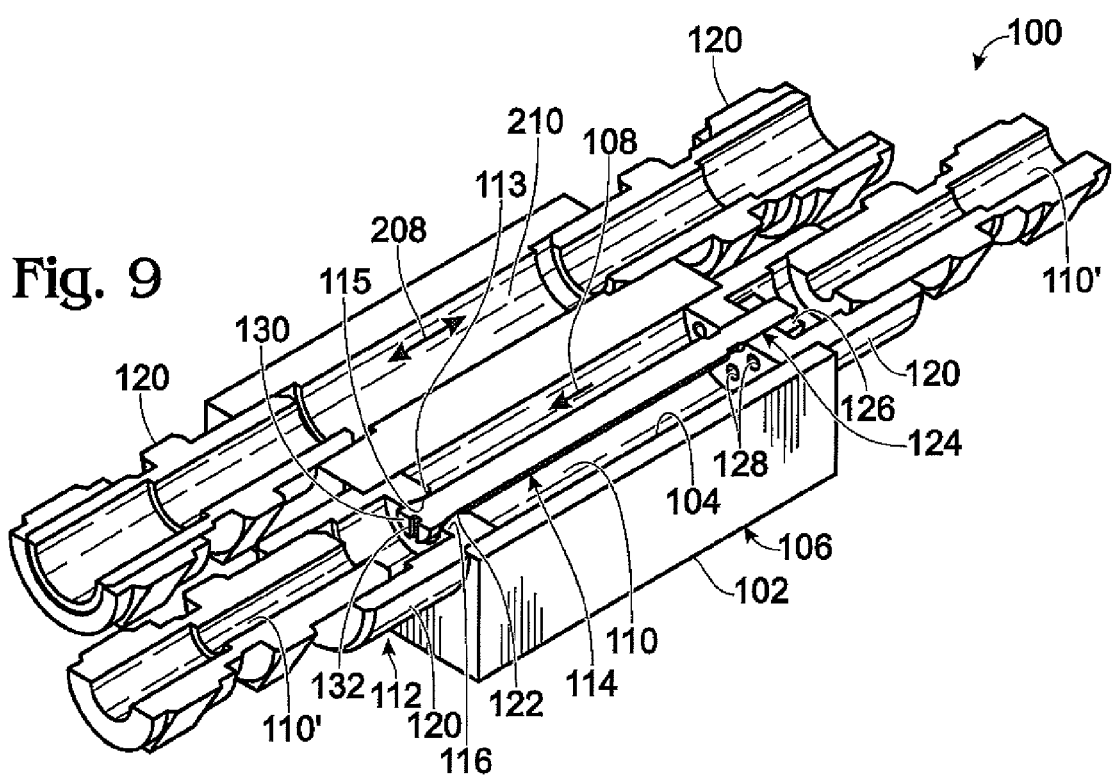
FIG. 9 is a cross-sectional view of another temperature-responsive valve assembly according to the present disclosure and which may be configured to utilize the reformate stream from a purification region as a gas stream of interest to regulate the flow of the byproduct stream through the valve assembly.

Less schematic illustrative, non-exclusive examples of temperature-responsive valve assemblies 100 according to the present disclosure are shown in FIGS. 8 and 9. FIG. 8 provides an example of a temperature-responsive valve assembly in which the gas stream of interest and the subject gas stream are the same gas stream. In this example, this gas stream flows as gas flow 108 through passage 110 in the valve assembly, as regulated by restrictive assembly 112. As depicted, the valve assembly includes shell 106 and optional throat assemblies, or couplings, 120, which each may function at least as a location-providing fluid connection with another section of a fluid passage to or from the valve assembly's shell. Because the temperature-responsive valve assembly 100 may provide at least a portion of a fluid conduit for the gas stream of interest, both the shell 106 and the throat assembly 120 may define internal passages, or cavities, 110, 110' through which the subject gas stream may flow. In FIG. 9, the temperature-responsive valve assembly includes first and second passages 110 and 210, through which the subject gas stream and the gas stream of interest may respectively flow as gas streams 108 and 208. Passages 110 and 210 may additionally or alternatively be (descriptively) referred to as regulating and regulated gas passages, respectively. As discussed, these streams may be the same or different streams in such an embodiment. As further discussed, in some embodiments, the gas stream of interest may be the reformate stream from a hydrogen-producing region of a fuel processing assembly, and the subject gas stream may be the byproduct stream from a purification region that receives the reformate stream to separate the reformate stream into the byproduct stream and a product hydrogen stream. The byproduct stream flowing through the valve assembly may be in fluid communication with a burner or other heating assembly that is adapted to receive the byproduct stream and to combust the byproduct stream as a combustible fuel stream to produce a heated exhaust stream, or heated output stream, to heat at least the hydrogen-producing region of the fuel processing assembly, such as to maintain the hydrogen-producing region at a suitable hydrogen-producing temperature or temperature range.

In the illustrative, non-exclusive examples shown in FIGS. 8 and 9, the throat assemblies 120 of the temperature-responsive valve assembly 100 are housed within shell 106, with a portion of each throat assembly 120 extending into the passage(s) formed by the shell. However, it is within the scope of the present disclosure that other constructions of the throat assembly may be utilized, such as which may enable the throat assembly to be supported on, within, or near the shell of the temperature-responsive valve assembly 100 while also supporting the obstructive member within passage 110. As also discussed, throat assemblies 120 are not required to all embodiments, and accordingly restrictive assemblies with other configurations of support members and obstructive members may be utilized.

In the illustrative, non-exclusive examples shown in FIGS. 8 and 9, the restrictive assembly is depicted as including an elongate obstructive member 114 and a support member 116 that form a portion of a throat assembly 120. As discussed, other configurations are within the scope of the present disclosure. For example, support member 116 may instead be an annular or other projection that extends from the inner wall 104 of the shell's housing and which does not form a portion of a throat assembly or other fluid coupling between the valve assembly and adjacent structure. In the depicted example, the obstructive element includes end regions 122 and 124 that are respectively supported within passage 110 by throat assemblies 120. End region 124 is mounted to throat assembly 120, and it is within the scope of the present disclosure that end region 124 may be adjustably mounted to the throat assembly, such as by a fastener 126. In the depicted example, the throat assembly proximate end region 124 includes a plurality of unobstructed openings 128 through which the subject gas stream may flow into passage 110 to form gas flow 108.

End region 122 of the obstructive member extends through an opening 115 in support member 116, which in the illustrated example is formed in one of the throat assemblies 120 of the valve assembly. As shown, end region 122 extends completely through opening 115 and terminates at an enlarged head 130, which is larger than opening 115. This configuration is not required to all embodiments. In some embodiments, end region 122 may extend only partially through opening 115, and in some embodiments, end region 122 may have a constant cross-section within and proximate opening 115. One or more valve orifices 113 are defined between end region 122 of the obstructive member and the support member. As illustrated, the one or more valve orifices are formed by the portion of opening 115 that is not occupied by end region 122.

As discussed, the restrictive assembly includes an obstructive member and a support member that are configured to move relative to each other responsive to the temperature of at least a gas stream of interest. As further discussed, this relative movement may be enabled by forming these members from materials having sufficiently different CTE's to define a predetermined range of relative movement within a selected temperature range. Generally, a material with a higher CTE will undergo a greater volume change in response to a change in temperature than a material with a lower CTE. Therefore, if the shell, throat assembly, or other support member of the temperature-responsive valve assembly's restrictive assembly has a higher CTE than the obstructive member, the support member will undergo a greater change in volume for a given change in temperature than will the obstructive member. The differential volume change of the two components of the restrictive assembly of the temperature-responsive valve assembly 100 may lead to an altered spatial relationship between the support member and the obstructive member, and thus a change in the size of the one or more valve orifices 113 defined by these members. For example, if the throat assembly and/or shell forms the support member and has a higher CTE than the obstructive member, then the shell/throat assembly may expand more than the obstructive member if the temperature of the restrictive assembly is increased, such as responsive to an increase in the temperature of the gas stream of interest. The relatively greater expansion of the support member relative to the obstructive member may then cause the support member to expand primarily in one direction, or in more than one direction, such as along its lateral axis and its longitudinal axis.

In the illustrated example shown in FIGS. 8 and 9, the obstructive member and the support member may be formed from materials having sufficiently different coefficients of thermal expansion for changes in the temperature of the gas stream of interest to sufficiently change the size of the one or more valve orifices to regulate the gas flow therethrough, such as to regulate the flow rate of byproduct stream to be used as fuel to produce a heated exhaust stream for heating the hydrogen-producing region of a corresponding fuel processing assembly. An illustrative, non-exclusive example of this relative movement is shown by comparing the restrictive assemblies of FIGS. 8 and 9, in which FIG. 9 depicts head 130 of end region 122 extending further away from opening 115 than in FIG. 8. Such a result may be obtained by obstructive member 114, or at least a portion thereof, having a greater CTE than support member 116. It is similarly within the scope of the present disclosure that a valve assembly may instead be configured to draw the head of end region 122 toward opening 115, such as if the obstructive member has a lower CTE than the support member.

In some embodiments, the throat assembly 120, as with the shell described above, may have a higher CTE than the obstructive member. Accordingly, for a given change in temperature encountered or sensed by the throat assembly, it may undergo a larger change in volume than the obstructive member 114. In that situation, opening 115 also may undergo a change in its dimensions, as the difference between the volume changes of the throat assembly 120 forming support member 116 and the obstructive member 114 may result in a difference in their relative sizes and, thus, a change in the size of opening 115. Independent of the relationship between the CTE's of the throat assembly and the obstructive member, it may be the case that the throat assembly 120 and the shell are constructed of the same material, so that they have the same CTE's and expand and contract to a similar extent in response to a given temperature change. However, it is within the scope of the disclosure that the shell and the throat assembly may have merely similar CTE's, or they may have different CTE's, so long as overall function of the temperature-responsive valve assembly 100 is not impaired.

The spatial relationship between the support member and the obstructive member 114 may be adjustable in the absence of a change in temperature sensed by the temperature-responsive valve assembly 100. Specifically, an adjustable or repositionable fastener 126 may be used to permit selective adjustment of the relative position of the obstructive member when the restrictive member is being installed or otherwise in an inactive configuration. For example, this adjustment may define the range of configurations between the restrictive assembly's members, and thus define the range of sizes of the one or more valve orifices, at least within a selected range of temperatures. A threaded fastener is an illustrative, non-exclusive example of a suitable adjustable fastener, although others may be used. In the illustrated example, head 130 includes a slot, or socket, 132 that is sized to receive the tip of a screwdriver or other suitable driver to enable a user to manually rotate the obstructive member and thereby adjust the axial position of the obstructive member relative to the support member when the valve assembly is in an inactive configuration. This may occur, for example, when the valve assembly or associated fluid conduits are disassembled or otherwise manipulated to enable access to the head.

As also discussed, the relative movement of the restrictive assembly's obstructive member and support member may be enabled in any suitable manner, which may include a differential in the CTE's of the materials from which these members are formed, but which is not exclusively required to be enabled by this differential. While referred to herein as an obstructive member and a support member, this terminology is not intended to require nor preclude each of these members from being formed as a unitary structure and/or from a single material.

INDUSTRIAL APPLICABILITY

The hydrogen-producing fuel processing assemblies and fuel cell systems disclosed herein are applicable to the hydrogen-production, energy-production, and fuel cell industries. In some applications, the thermally-responsive valve assemblies, and corresponding methods, may provide a feedback mechanism that allows automatic, temperature-responsive regulation of the rate at which a fuel stream is combusted to heat the hydrogen-producing region, responsive at least in part, if not completely, to the temperature at which a hydrogen-containing product gas is delivered to a purification region of the hydrogen generation assembly.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions, and/or properties disclosed herein. Similarly, where the claims recite "a" or "a first" element or the equivalent thereof such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. An automatic gas distribution system, comprising:
   a hydrogen-producing region configured to produce a hydrogen-containing reformate gas stream containing hydrogen gas as a majority component;
   a heating assembly configured to combust a fuel stream to produce a heated exhaust stream to heat the hydrogen-producing region;
   a separation region configured to receive the reformate gas stream and to separate the reformate gas stream into at least a product hydrogen stream, which contains a greater concentration of hydrogen gas than the reformate stream, and a byproduct stream, which has a reduced concentration of hydrogen gas than the reformate gas stream;
   a first fluid conduit establishing fluid communication for the reformate gas stream between the hydrogen-producing region and the separation region;
   a second fluid conduit establishing fluid communication for the byproduct stream between the separation region and the heating assembly; and
   an automatic temperature-responsive valve assembly configured reversibly to alter a gas flow of at least one of the product hydrogen stream and the byproduct stream responsive to the temperature of the valve assembly.

2. The automatic gas distribution system of claim 1, wherein the automatic temperature-responsive valve assembly is configured reversibly to alter the gas flow of the byproduct stream to the heating assembly.

3. The automatic gas distribution system of claim 1, wherein the hydrogen-producing region is adapted to produce the reformate gas stream with a temperature-dependent reaction, wherein the automatic temperature-responsive valve assembly is configured to alter production of the reformate stream by altering an amount of heat provided to the hydrogen-producing region by the heating assembly by altering the flow of the byproduct stream to the heating assembly, and wherein the heating assembly is configured to combust at least a portion of the byproduct stream as fuel to produce the heated exhaust stream to heat the hydrogen-producing region.

4. The automatic gas distribution system of claim 1, wherein the automatic temperature-responsive valve assembly is configured to alter the gas flow responsive to a thermodynamic property of the valve assembly.

5. The automatic gas distribution system of claim 4, wherein the thermodynamic property of the valve assembly is a relationship between a plurality of coefficients of thermal expansion of the materials from which the valve assembly is constructed.

6. The automatic gas distribution system of claim 5, wherein the valve assembly comprises a shell that defines a passage through which the gas flow may selectively flow, wherein the valve assembly further includes a restrictive assembly with at least an obstructive member having a first coefficient of thermal expansion and a support member having a second coefficient of thermal expansion, and wherein the valve assembly is configured such that a difference between the first and second coefficients of thermal expansion determines the manner in which the valve assembly alters the flow of at least one of the product hydrogen stream and the byproduct stream through the passage.

7. The automatic gas distribution system of claim 6, wherein the support member and the obstructive member selectively define at least one valve orifice therebetween through which the gas flow must travel to flow through the valve assembly, and further wherein the relationships between the first and the second coefficients of thermal expansion change the size of the at least one valve orifice responsive to the temperature of the support member and the obstructive member.

8. The automatic gas distribution system of claim 6, wherein the support member forms a portion of the shell.

9. The automatic gas distribution system of claim 1, wherein the separation region is a pressure-driven separation region, and wherein the pressure-driven separation region is configured to increase a concentration of hydrogen gas in the product hydrogen stream in response to a flow alteration by the valve assembly.

10. The automatic gas distribution system of claim 1, wherein the automatic temperature-responsive valve assembly is configured to respond at least to a temperature of the reformate stream.

11. The automatic gas distribution system of claim 1, wherein the automatic temperature-responsive valve assembly is configured to respond at least to a temperature of at least one of the product hydrogen stream and the byproduct stream.

12. An apparatus for automatically altering a gas flow in a system of conduits in a hydrogen-generation assembly configured to produce a hydrogen gas, the apparatus comprising:
    means for producing a reformate stream containing hydrogen gas as a majority component;
    a heating assembly configured to heat the means for producing the reformate stream to a hydrogen-producing temperature;
    means for separating the reformate stream into a product hydrogen stream and a byproduct stream, wherein the product hydrogen stream has an increased concentration of hydrogen gas relative to the reformate stream and the byproduct stream has a reduced concentration of hydrogen gas relative to the reformate stream;
    a first conduit establishing fluid communication between the means for producing the reformate stream and the means for separating the reformate stream into a product hydrogen stream and a byproduct stream;
    a second conduit establishing fluid communication between the means for separating and the heating assembly; and
    means for automatically and reversibly altering a gas flow in the second conduit in response to a temperature of the means for automatically and reversibly altering a gas flow, wherein the means for automatically and reversibly altering a gas flow comprises at least two materials having different coefficients of thermal expansion and further wherein automatic and reversible alteration of the gas flow is determined at least partially by a difference between the coefficients of thermal expansion.

13. The apparatus of claim 12, wherein the means for automatically and reversibly altering a gas flow is configured to induce an increase in backpressure in the first conduit.

14. The apparatus of claim 13, wherein the means for separating is configured to respond to an increase in the backpressure of the first conduit by altering a ratio of hydrogen gas in the product hydrogen stream to hydrogen gas in the byproduct stream.

15. The apparatus of claim 12, wherein the second conduit is configured to provide a passage for the byproduct stream, and wherein the heating assembly is configured to combust at least a portion of the byproduct stream to heat the means for producing the reformate stream.

16. The apparatus of claim 12, wherein the means for automatically and reversibly altering a gas flow is configured to increase a pressure of a gas within at least the first conduit in response to an increase in the temperature of the means for reversibly altering a gas flow.

17. The apparatus of claim 16, wherein the means for separating is configured to respond to an increase in the pressure within the first conduit by altering a ratio of hydrogen gas in the product hydrogen stream to hydrogen gas in the byproduct stream.

18. The apparatus of claim 12, wherein the means for automatically and reversibly altering a gas flow is configured such that differential expansion of the two materials causes more or less gas flow therethrough.

19. The apparatus of claim 18, wherein the means for automatically and reversibly altering a gas flow is configured to increase a pressure of a gas within at least the first conduit in response to differential expansion of the two materials, and wherein the means for separating is configured to respond to an increase in the pressure within the first conduit by altering a ratio of hydrogen gas in the product hydrogen stream to hydrogen gas in the byproduct stream.

20. The apparatus of claim 12, wherein the means for automatically and reversibly altering a gas flow is a temperature-responsive valve assembly configured to operate non-electrically and in the absence of computer control.

21. The apparatus of claim 12, wherein the means for automatically and reversibly altering a gas flow includes a restrictive assembly that includes an obstructive member and a support member that selectively defines at least one valve orifice therebetween, and further wherein the size of the valve orifice is determined by the differential expansion of the two materials.

22. The apparatus of claim 21, wherein the obstructive member and the support member are in thermal communication with the byproduct stream to be heated by the byproduct stream.

23. The apparatus of claim 21, wherein the obstructive member and the support member are in thermal communication with the reformate stream to be heated by the reformate stream.

24. A method for automatic gas distribution, comprising:
producing, in a hydrogen-producing region, a mixed gas stream containing hydrogen gas and other gases;
receiving the mixed gas stream at a purification assembly;
separating with the purification assembly the mixed gas stream into at least a product hydrogen stream and a byproduct stream;
contacting thermally, with a temperature-responsive valve assembly, a first gas flow selected from a group consisting of the mixed gas stream, the product hydrogen stream, and the byproduct stream; and
altering reversibly a second gas flow based on the temperature of the first gas flow and a thermodynamic property of the temperature-responsive valve assembly.

25. The method for automatic gas distribution of claim 24, wherein the second gas flow comprises a fuel for use by a heating assembly to heat the hydrogen-producing region, and further wherein the method comprises combusting the second gas flow to heat the hydrogen-producing region.

26. The method of claim 25, further comprising the step of: altering, with the temperature-responsive valve assembly, the second gas flow provided to the heating assembly.

27. The method of claim 26, further comprising the step of: heating the hydrogen-producing region in proportion to the amount of the second gas flow provided to the heating assembly.

28. The method of claim 24, wherein the temperature-responsive valve assembly comprises at least a first material having a first coefficient of thermal expansion and a second material having a second coefficient of thermal expansion, and further wherein the thermodynamic property comprises a difference between the first and the second coefficients of thermal expansion.

29. The method of claim 24, wherein the mixed gas stream is carried by a first conduit in fluid communication with the temperature-responsive valve assembly, and wherein the method includes automatically altering the second gas flow with the temperature-responsive valve assembly responsive to the temperature of the mixed gas stream in the first conduit.

30. The method of claim 24, wherein the first gas flow and the second gas flow are the same gas stream.

31. The method of claim 24, wherein the first gas flow and the second gas flow are comprised of the byproduct stream.

32. The method of claim 24, wherein the first gas flow is the mixed gas stream and the second gas flow is the byproduct stream.

* * * * *